US012569811B2

(12) United States Patent
Hashimoto et al.

(10) Patent No.:  US 12,569,811 B2
(45) Date of Patent:      Mar. 10, 2026

(54) RAW-MATERIAL LIQUID CONCENTRATION SYSTEM AND CONCENTRATION APPARATUS

(71) Applicant: Asahi Kasei Kabushiki Kaisha, Tokyo (JP)

(72) Inventors: Tomotaka Hashimoto, Tokyo (JP); Yuki Suga, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 866 days.

(21) Appl. No.: 17/768,018

(22) PCT Filed: Oct. 9, 2020

(86) PCT No.: PCT/JP2020/038370
  § 371 (c)(1),
  (2) Date: Apr. 11, 2022

(87) PCT Pub. No.: WO2021/070955
  PCT Pub. Date: Apr. 15, 2021

(65) Prior Publication Data
  US 2024/0091709 A1      Mar. 21, 2024

(30) Foreign Application Priority Data
  Oct. 11, 2019    (JP) ................................. 2019-187745

(51) Int. Cl.
  *B01D 61/36*        (2006.01)
(52) U.S. Cl.
  CPC ........ *B01D 61/364* (2013.01); *B01D 2323/02* (2013.01); *B01D 2323/21839* (2022.08); *B01D 2325/02833* (2022.08)

(58) Field of Classification Search
  CPC ........ B01D 61/364; B01D 2325/02833; B01D 2323/21839; B01D 2323/02
  See application file for complete search history.

(56) References Cited

U.S. PATENT DOCUMENTS

| | | | |
|---|---|---|---|
| 5,110,475 A | 5/1992 | Rossling et al. | |
| 2001/0025819 A1 | 10/2001 | Bowser | |

(Continued)

FOREIGN PATENT DOCUMENTS

| | | |
|---|---|---|
| CN | 102698618 A | 10/2012 |
| CN | 106310948 A | 1/2017 |

(Continued)

OTHER PUBLICATIONS

Machine translation of JP2011200770.*

(Continued)

*Primary Examiner* — Benjamin L Lebron
(74) *Attorney, Agent, or Firm* — Morgan, Lewis & Bockius LLP

(57) ABSTRACT

This raw-material liquid concentration system is for use in a pharmaceutical product manufacturing process, and employs a membrane-distillation method involving: bringing a raw-material liquid containing a solvent and a solute into contact with cooling water through a membrane-distillation membrane; passing the solvent in the raw-material liquid through the membrane-distillation membrane in the form of vapor; and causing the solvent to move toward the side of the cooling water, wherein the membrane-distillation membrane is a porous membrane that has a water contact angle of at least 90° at the surface thereof, has an average pore diameter of 0.02-0.5 μm, and has a porosity of 60-90%.

14 Claims, 2 Drawing Sheets

(56) References Cited

U.S. PATENT DOCUMENTS

| | | | |
|---|---|---|---|
| 2010/0300946 A1 | 12/2010 | Nguyen et al. |
| 2016/0089638 A1 | 3/2016 | Schuster et al. |
| 2017/0173536 A1 | 6/2017 | Nagata et al. |
| 2017/0326486 A1 | 11/2017 | Chu et al. |
| 2020/0109070 A1 | 4/2020 | Hashimoto et al. |

FOREIGN PATENT DOCUMENTS

| | | | |
|---|---|---|---|
| CN | 106474941 A | 3/2017 |
| CN | 107158953 A | 9/2017 |
| JP | H04-502124 A | 4/1992 |
| JP | H06-226066 A | 8/1994 |
| JP | H11-075759 A | 3/1999 |
| JP | 2011-200770 A | 10/2011 |
| JP | 2014-034022 A | 2/2014 |
| JP | 2016-523698 A | 8/2016 |
| JP | 2017-515662 A | 6/2017 |
| JP | 2019-048257 A | 3/2019 |
| WO | 95/35153 A2 | 12/1995 |
| WO | 2012/081981 A1 | 6/2012 |
| WO | 2013/170977 A1 | 11/2013 |
| WO | 2015/168584 A1 | 11/2015 |
| WO | 2016/006670 A1 | 1/2016 |
| WO | 2018/174279 A1 | 9/2018 |

OTHER PUBLICATIONS

International Search Report issued in corresponding International Patent Application No. PCT/JP2020/038370 dated Nov. 24, 2020.

International Preliminary Report on Patentability and Written Opinion issued in corresponding International Patent Application No. PCT/JP2020/038370 dated Apr. 21, 2022.

Supplementary European Search Report issued in corresponding European Patent Application No. 20873422.8 dated Nov. 8, 2022.

Office Action issued in European Patent Application No. 20873422.8 dated Oct. 24, 2025.

Hogan et al., "A New Option: Osmotic Distillation," Chemical Engineering Progress, 94 (7): 49-61 (1998).

Choudhury et al., "Fouling and wetting in the membrane distillation driven wastewater reclamation process—A review," Advances in Colloid and Interface Science, 269: 370-399 (2019).

Garcia-Payo et al., "Air gap membrane distillation of aqueous alcohol solution," Journal of Membrane Science, 169 (1): 61-80 (2000).

Lee et al., "Electrospun nanofiber membranes incorporating fluorosilane-coated TiO2 nanocomposite for direct contact membrane distillation," Journal of Membrane Science, 520: 145-154 (2016).

* cited by examiner (a)

(b)

RAW-MATERIAL LIQUID CONCENTRATION SYSTEM AND CONCENTRATION APPARATUS

FIELD

The present invention relates to a feed solution concentration system and a concentration apparatus. Specifically, the present invention relates to a feed solution concentration system and a concentration apparatus capable of suppressing deterioration and reduction of components in a feed solution and efficiently concentrating the feed solution by separating a portion of the solvent from a feed solution containing a drug substance and an intermediate by a membrane distillation method to concentrate the feed solution.

BACKGROUND

Among feed solutions requiring concentration, there are numerous industrial feed solutions containing both water and an organic solvent as a solvent.

Substances comprising amino acid sequences such as peptides, enzymes, and proteins are widely used as diagnostic/test drugs and pharmaceuticals. As they are very expensive, it is important to recover these substances in high yield without denaturation in manufacturing steps.

As one method for stably and efficiently extracting and purifying proteins, an ultrafiltration membrane is generally used. Since the ultrafiltration membrane, which is a technique for separating components by sieving, is a separation method which does not involve a temperature change, it is possible to reduce energy load. For example, proteins having a molecular weight of several thousands to several millions can often be fractionally purified with an ultrafiltration membrane. When an ultrafiltration membrane is used, components having a size larger than the cut-off molecular weight of the membrane are retained in the feed solution, but water, which is a solvent, passes through the membrane. Therefore, the ultrafiltration membrane is effective for concentrating a solution containing proteins (for example, PTL 1).

Further, a reverse osmosis (RO) method using a membrane which allows a solvent to permeate at a molecular level is known. The RO method is a method for concentrating a feed solution by pressurizing a feed solution to a predetermined pressure higher than the osmotic pressure of the feed solution and then supplying the feed solution to an RO membrane module, where only the solvent (typically water) in the feed solution permeates the RO membrane and is removed (for example, PTL 2).

As another concentration method for a feed solution, membrane distillation (MD) methods, which use vapor pressure difference in a liquid to separate a solvent in a feed solution, are known. As one method of membrane distillation, the DCMD method (Direct Contact MD), in which a feed solution is concentrated by bringing the feed solution into contact with cooling water having a temperature lower than the feed solution and thereby moving a vapor free of active substances in the feed solution from the feed solution to the cooling water, is well known (for example, PTL 3).

CITATION LIST

Patent Literature

[PTL 1] WO 2013/170977
[PTL 2] Japanese Unexamined Patent Publication (Kokai) No. 11-75759
[PTL 3] WO 2016/006670

SUMMARY

Technical Problem

In the ultrafiltration membrane described in PTL 1, since it is necessary to pressurize the feed solution, there is an issue where the adhesion of the solute contained in the feed solution to the membrane surface occurs, reducing the recovery rate. In the case of medium molecule drugs being developed these days, where the molecular weight is less than the cut-off molecular weight of the ultrafiltration membrane, the solute partially permeates the ultrafiltration membrane, thus reducing the recovery rate.

In the RO method of PTL 2, since it is necessary to pressurize the feed solution, there is an issue where the adhesion of the solute contained in the feed solution to the membrane surface occurs, reducing the recovery rate. In the RO method, the osmotic pressure of the solvent in the concentrated feed solution does not exceed the pressure of the high-pressure pump used for pressurization, and thus the concentration rate of the feed solution by the RO method is limited by the ability of the pump.

According to the membrane distillation method of PTL 3, when the membrane for membrane distillation is wetted, the feed solution flowed into the cooling water side, and thus concentration cannot be carried out. Further, since a porous membrane having a small pore size was selected, there was an issue in which the vapor permeation amount was small. In order to increase the vapor permeation amount, it is necessary to increase the temperature of the feed solution. In such cases, the feed solution is often heated to 60° C. or higher. There are few reported examples in which the membrane distillation method is applied to the concentration of a feed solution containing a solute that may be denatured by heat, such as an enzyme or a peptide.

An object of the present invention is to provide a concentration system and a concentration apparatus, which suppress wetting of a membrane for membrane distillation, which is an issue of a membrane distillation method, and have a processing rate that is industrially feasible even at room temperature, for a feed solution in a drug manufacturing process.

Solution to Problem

The present invention has been made to achieve the above object.

The present inventors have discovered that when concentrating a feed solution by a membrane distillation method, by using a porous membrane having high water permeability and strong hydrophobicity as the membrane for membrane distillation, wetting of the membrane for membrane distillation by the feed solution is suppressed and vapor can be efficiently extracted even at room temperature. As a result, denaturation of active components in the feed solution can be prevented while efficient concentration can be carried out, thus arriving at the present invention.

The present invention is described as follows.

<<Aspect 1>> A feed solution concentration system for a drug manufacturing process, the feed solution concentration system using a membrane distillation method in which a feed solution containing a solute and a solvent is brought into contact with cooling water via a membrane for membrane distillation and the solvent in the feed solution is passed through the membrane for membrane distillation as a vapor and moved to the cooling water side, wherein a porous membrane used as the membrane for membrane distillation has a surface water contact angle of 90° or greater, an average pore size in a range of 0.02 μm or greater and 0.5 μm or less, and a porosity of 60% or greater and 90% or less.

<<Aspect 2>> The feed solution concentration system according to Aspect 1, wherein a hydrophobic polymer is attached to at least a portion of the membrane for membrane distillation.

<<Aspect 3>> The feed solution concentration system according to Aspect 2, wherein an adhesion amount of the hydrophobic polymer has a distribution in a thickness direction of the membrane for membrane distillation, and an adhesion amount on a surface layer of at least one side of the membrane for membrane distillation is larger than an adhesion amount of an inner portion.

<<Aspect 4>> The feed solution concentration system according to Aspect 3, wherein the adhesion amount of the hydrophobic polymer decreases from the surface layer of one side of the membrane for membrane distillation toward a surface layer on an opposite side.

<<Aspect 5>> The feed solution concentration system according to Aspect 4, wherein the opposite side having a smaller adhesion amount of the hydrophobic polymer is hydrophilized, and a surface of the hydrophilized side is brought into contact with cooling water; and the one side having a larger adhesion amount of the hydrophobic polymer is not hydrophilized, and the one side is brought into contact with the feed solution.

<<Aspect 6>> The feed solution concentration system according to any one of Aspects 2 to 5, wherein the hydrophobic polymer is a polymer having a fluorine atom-containing group in a side chain, and comprises at least one side chain selected from a (per)fluoroalkyl group, a (per)fluoropolyether group, an alkylsilyl group, and a fluorosilyl group.

<<Aspect 7>> The feed solution concentration system according to any one of Aspects 1 to 6, wherein a material of the membrane for membrane distillation includes at least one resin selected from the group consisting of polysulfone, polyethersulfone, polyethylene, polypropylene, polyvinylidene fluoride, polytetrafluoroethylene, an ethylene/tetrafluoroethylene copolymer, and polychlorotrifluoroethylene.

<<Aspect 8>> The feed solution concentration system according to any one of Aspects 1 to 7, wherein the solvent includes at least one selected from the group consisting of water, acetonitrile, methanol, ethanol, and isopropanol.

<<Aspect 9>> The feed solution concentration system according to any one of Aspects 1 to 8, wherein the solute is at least one selected from the group consisting of an amino acid, a peptide, a protein, a saccharide, a vaccine, a nucleic acid, an antibiotic, an antibody-drug conjugate (ADC), and a vitamin.

<<Aspect 10>> The feed solution concentration system according to any one of Aspects 1 to 9, wherein the solute has a number-average molecular weight of 100 to 50,000.

<<Aspect 11>> The feed solution concentration system according to any one of Aspects 1 to 10, wherein the feed solution is regulated to a temperature range of 5° C. or higher and 50° C. or lower.

<<Aspect 12>> A concentration apparatus for concentrating a feed solution by a membrane distillation method, the concentration apparatus comprising a membrane for membrane distillation, wherein a membrane used as the membrane for membrane distillation has a membrane surface water contact angle of 90° or greater, an average pore size in a range of 0.02 μm or greater and 0.5 μm or less, and a porosity of 60 to 90%.

<<Aspect 13>> The concentration apparatus according to Aspect 12, wherein a hydrophobic polymer is attached to at least a portion of the membrane for membrane distillation.

<<Aspect 14>> The concentration apparatus according to Aspect 13, wherein an adhesion amount of the hydrophobic polymer has a distribution in a thickness direction of the membrane for membrane distillation, and an adhesion amount on a surface layer of at least one side of the membrane for membrane distillation is larger than an adhesion amount of an inner portion.

Advantageous Effects of Invention

In the concentration system of the present invention, for example, when a feed solution containing a solute comprising an amino acid sequence is concentrated by a membrane distillation process at near room temperature, concentration can be carried out without the occurrence of wetting while substantially maintaining the solute composition of the feed solution.

In a manufacturing process of a drug, when the concentration system of the present invention is applied to the concentration of a feed solution containing useful components used in pharmaceutical applications, the useful components that are sensitive to heat and pressure can be concentrated without denaturation and with a high recovery rate.

DESCRIPTION OF EMBODIMENTS

Hereinafter, preferred embodiments of the present invention will be specifically described in detail as non-limiting examples.

<<Feed Solution Concentration System>>

The feed solution concentration system of the present invention will be described with reference to the drawings.

Figure 1:
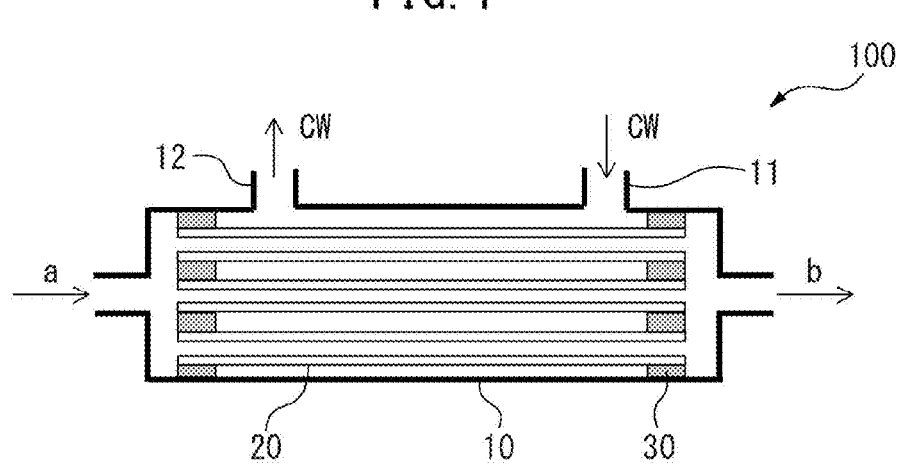
FIG. 1 is a schematic diagram for describing one example of an embodiment of a membrane module applied in the feed solution concentration system of the present invention.

FIG. 1 illustrates one example of a membrane module for membrane distillation that is preferably used when concentrating a feed solution by membrane distillation in the concentration system of the present invention.

In the membrane module for membrane distillation (100) of FIG. 1, a plurality of hollow-fiber membranes for membrane distillation (20) are housed in a housing (10). Both ends of these membranes are adhesively fixed with an adhesive resin (30). Both ends of each membrane for membrane distillation (20) are open without being blocked.

A side surface of the housing (10) comprises a first housing side pipe (11) for flowing in cooling water (CW) and a second housing side pipe (12) for discharging the cooling water (CW), and the cooling water (CW) can be circulated in the outside space of the membrane for membrane distillation (20) thereby.

The ends of the housing (10) in the axial direction (left-right direction in FIG. 1) comprise an opening on the left side for flowing in a feed solution (a) and an opening on the right side for discharging the feed solution (a), and the feed solution (a) can be circulated in the hollow portion of the membrane for membrane distribution (20).

The inner portion of the membrane module for membrane distillation (100) is divided into a space on the hollow side of the membrane for membrane distillation (20) and a space on the outside space side of the membrane for membrane distillation (20) by the membrane for membrane distillation (20). Except that a predetermined solvent can pass through the outer wall of the membrane for membrane distillation (20) and travel back and forth, these two spaces are fluidly shielded.

It is necessary that the membrane for membrane distillation (20) have, for example, a hollow-fiber shape and the outer wall thereof be strongly hydrophobic, be porous while preventing the ingress of liquid into the inner portion, and allow only gas to pass therethrough. Further, since high vapor permeability is required even at room temperature, it is necessary for the membrane to have high porosity and an appropriate average pore size.

In the present invention, a porous membrane having a membrane surface water contact angle of 90° or greater, an average pore size in the range of 0.02 μm or greater and 0.5 μm or less, and a porosity of 60% or greater and 90% or less is used as the membrane for membrane distillation.

To concentrate the feed solution by the membrane distillation method, the feed solution (a) is flowed to one side (the space on the hollow side of the hollow-fiber membrane for membrane distillation in FIG. 1) of the membrane for membrane distillation (20). The cooling water (CW) having a temperature lower than that of the feed solution (a) is flowed to the other side (the outside space side of the membrane for membrane distillation in FIG. 1). The pores communicating with both spaces inside the membrane wall are then brought into contact with the feed solution (a) and the cooling water (CW) through the membrane wall. As a result, vapor generated from the feed solution (a), which has a high vapor pressure, passes through the membrane wall, moves to the cooling water (CW), which has a low vapor pressure, and is cooled and liquefied, thereby concentrating the feed solution (a).

Figure 2:
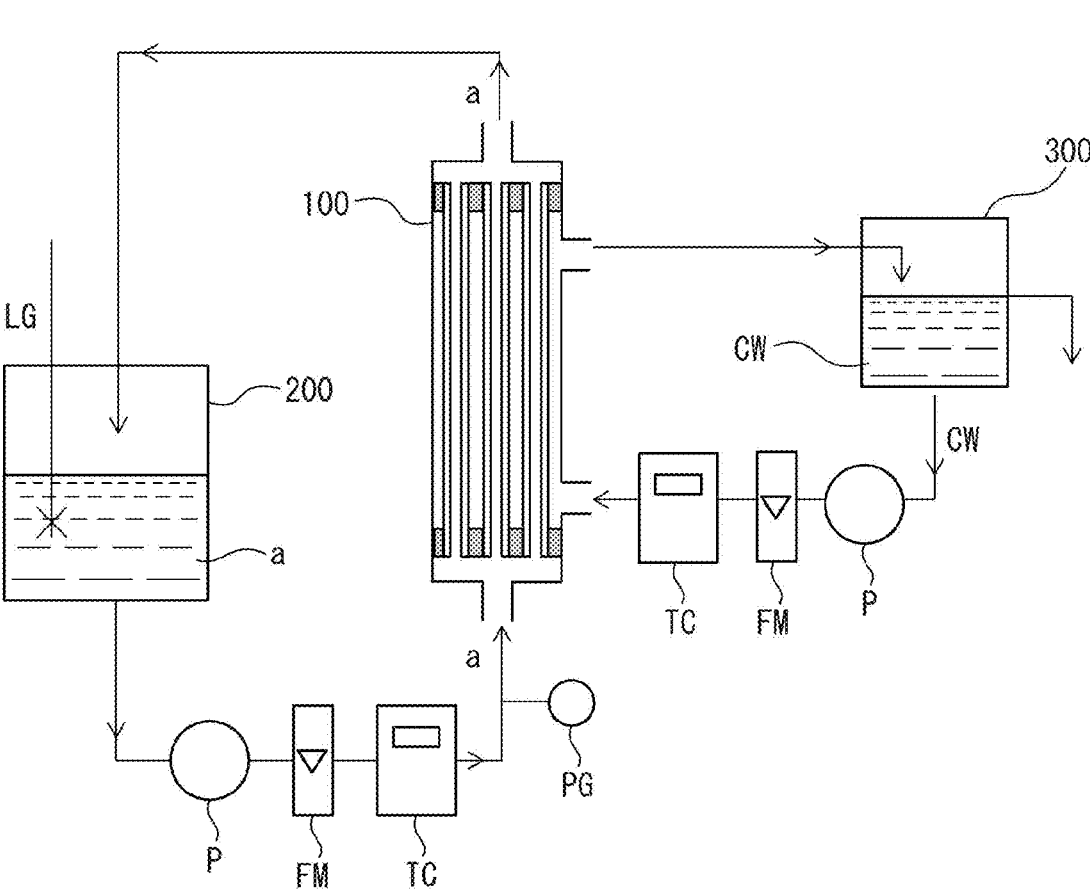
FIG. 2 is a schematic diagram for describing one example of an embodiment of the feed solution concentration system of the present invention.

FIG. 2 illustrates one example of the concentration system of the present invention.

In the concentration system of FIG. 2, the membrane module for module distillation (100) illustrated in FIG. 1 is provided with a means (piping system) for circulating the feed solution (a) at both ends in the axial direction thereof. A feed solution storage tank (200), a pump (P) for circulating the feed solution (a), a flow meter (FM) for indicating a circulation flow rate, a flow rate regulator (not shown) for regulating the circulation flow rate, a temperature controller (TC) for maintaining the temperature of the feed solution (a) to a preset temperature, and a pressure gauge (PG) for displaying a hydraulic pressure when supplying the feed solution (a) to the membrane module for membrane distillation (100) are mounted to the piping system for circulating the feed solution (a). A level gauge (LG) is provided to the feed solution storage tank (200). By the degree of decrease of the liquid level, a concentration rate can be estimated.

The housing side pipes of the membrane module for membrane distillation (100) are provided with a means (piping system) for circulating the cooling water (CW). A cooling water storage tank (300), a pump (P) for circulating the cooling water (CW), a flow meter (FM) for indicating a circulation flow rate, a flow rate regulator (not shown) for regulating the circulation flow rate, and a temperature controller (TC) for maintaining the temperature of the cooling water (CW) to a preset temperature are mounted to the piping system. The solvent is moved from the feed solution (a) to the cooling water by membrane distillation, increasing the volume of the cooling water over time. Therefore, the amount stored in the cooling water storage tank (300) is increased by the continuation of membrane distillation. When it is possible to dispose of the cooling water (CW), an overflow port is installed in the cooling water storage tank (300), and the amount of cooling water stored can be maintained at a constant volume.

In order to handle a feed solution (a) containing a component that is decomposed by heating, such as a peptide or a protein, it is necessary to maintain the feed solution (a) at a low temperature (for example, 50° C. or lower) in a feed solution concentration system for the manufacture of drugs. As a solvent (b) of the feed solution (a), a liquid having a low surface tension, such as acetonitrile, methanol, ethanol, or isopropanol may be used.

From the foregoing, it is required that the membrane for membrane distillation be strongly hydrophobic so as to not become wet even with liquids having a low surface tension and have high vapor permeability in order to effectively extract a vapor of the solvent (b) from the feed solution (a) at room temperature.

Therefore, it is required that the membrane for membrane distillation used in the present invention be strongly hydrophobic and have a water contact angle of 90° or greater. Further, it is necessary for the porous membrane to ensure high vapor permeability, have an average pore size in the range of 0.02 μm or greater and 0.5 μm or less, and have a porosity of 60% or greater and 90% or less. These requirements will be described later.

<<Each Element of Feed Solution Concentration System>>

An overview of the concentration of a feed solution by the feed solution concentration system of the present invention is described above. In the following, each element constituting the feed solution concentration system of the present invention will be described in detail.

<Feed Solution (a)>

The feed solution (a) is a fluid containing a solute and a solvent (b), to be concentrated by the system of the present invention. The feed solution (a) may be an emulsion as long as the emulsion is a fluid.

Examples of the feed solution (a) applicable to the present invention include solutions or dispersions containing drugs, drug feeds, drug substances, and drug intermediates (hereinafter, collectively referred to as "pharmaceutical substance"); foods, seawater, and accompanying water discharged from gas fields and oil fields.

In the feed solution concentration system of the present invention, a concentrate (c) in which the solvent is removed can be obtained while the composition of the feed solution a is maintained substantially as-is. Therefore, when the feed solution concentration system of the present invention is applied to the concentration of a solution or a dispersion containing a pharmaceutical substance as a solute, it is possible to carry out concentration and maintain drug efficacy.

[Solute of Feed Solution a]

As the pharmaceutical substance, a useful substance selected from the group consisting of an amino acid, a peptide, a protein, a saccharide, a vaccine, a nucleic acid, an antibiotic, an antibody-drug conjugate (ADC), and a vitamin is used as a solute. It is preferable that the solute be dissolved or dispersed in a suitable solvent.

The amino acid is a compound having one amino acid skeleton composed of a carboxyl group, an amino group, and a moiety connecting therebetween. The amino acid herein refers to a concept that encompasses essential amino acids, non-essential amino acids, and non-natural amino acids.

Examples of the essential amino acids include tryptophan, lysine, methionine, phenylalanine, threonine, valine, leucine, and isoleucine. Examples of the non-essential amino acid include arginine, glycine, alanine, serine, tyrosine, cysteine, asparagine, glutamine, proline, aspartic acid, and glutamic acid.

A non-natural amino acid refers to any artificial compound which has an amino acid skeleton in the molecule and does not exist in nature. However, examples of the non-natural amino acid as a solute of the pharmaceutical substance include ones obtained by a desired labeled compound to an amino acid skeleton. Examples of the labeled compound include dyes, fluorescent substances, luminescent substances, enzyme substrates, coenzymes, antigenic substances, and protein-binding substances.

Preferable examples of the non-natural amino acid as a solute of the pharmaceutical substance include labeled amino acids and functionalized amino acids.

The labeled amino acid is a non-natural amino acid in which an amino acid skeleton and a labeled compound are bound. Specific examples thereof include an amino acid in which a labeled compound is bound to an amino acid skeleton including an aromatic ring in a side chain.

Examples of the functionalized amino acid include photoresponsive amino acids, photoswitch amino acids, fluorescent probe amino acids, and fluorescent labeled amino acids.

A peptide refers to a compound having 2 to less than 70 amino acid residues bound together, and may be linear or cyclic. Examples of the peptide include L-alanyl-L-glutamine, β-alanyl-L-histidine cyclosporine, and glutathione.

A protein generally refers to a compound having a longer chain than a peptide, among compounds having amino acid residues bound together. The protein herein is preferably one applicable as a protein formulation.

Examples of the protein formulation include interferon α, interferon β, interleukins 1 to 12, growth hormone, erythropoietin, insulin, granulocyte colony-stimulating factor (G-CSF), tissue plasminogen activator (TPA), natriuretic peptide, blood coagulation factor VIII, somatomedin, glucagon, growth hormone-releasing factor, serum albumin, and calcitonin.

Examples of the saccharide include monosaccharides, disaccharides, saccharide chains (excluding disaccharides), and saccharide chain derivatives.

Examples of the monosaccharide include glycose, fructose, galactose, mannose, ribose, and deoxyribose. Examples of the disaccharide include maltose, sucrose, and lactose.

The saccharide chain herein refers to a concept that excludes disaccharides, and examples thereof include glucose, galactose, mannose, fucose, xylose, glucuronic acid, and iduronic acid. Examples of the saccharide chain derivative include saccharide derivatives such as N-acetylglucosamine, N-acetylgalactosamine, and N-acetylneuraminic acid.

Examples of the vaccine include hepatitis A vaccine, hepatitis B vaccine, and hepatitis C vaccine;

examples of the nucleic acid include an oligonucleotide, RNA, an aptamer, and a decoy; and examples of the antibiotic include streptomycin and vancomycin.

Examples of the vitamin include vitamin A, vitamin B, and vitamin C, and also include derivatives and salts thereof. Vitamin B encompasses, for example, vitamin B6 and vitamin B12.

The number-average molecular weight of the solute contained in the feed solution may be about 100 to 75,000, preferably about 100 to 50,000, and more preferably about 100 to 10,000. It is particularly preferable that the solute be a compound having a low molecular weight of 100 to 6,000.

When the molecular weight of the solute is excessively low, the solute may permeate through the membrane for membrane distillation. When the molecular weight is excessively high, solute adhesion to a membrane surface may occur. Neither thereof is preferable.

[Solvent (b) in Feed Solution (a)]

The solvent (b) of the feed solution (a) is a liquid, and can be any inorganic solvent or organic solvent as long as the solute in the feed solution (a) can be dissolved or dispersed.

The solvent is preferably water, or acetonitrile, methanol, ethanol, or isopropanol. One or more selected therefrom may be appropriately selected and used. The solvent may be a mixture containing two or more selected from, for example, water, acetonitrile, methanol, and isopropanol.

<Concentrate (c)>

The concentrate (c) obtained by concentrating the feed solution (a) is obtained by maintaining the solute in the feed solution (a) substantially as-is and preferentially separating the solvent (b). In the feed solution concentration system of the present invention, the amount of the solvent (b) separated from the feed solution (a) can be controlled arbitrarily.

<Membrane for Membrane Distillation>

It is preferable that a porous membrane be used as the membrane for membrane distillation used in the present invention.

The porous membrane has pores (through-holes) which communicate from one surface of the membrane to the other surface thereof in the thickness direction. The pores may be voids in a network of the membrane material (for example, a polymer) or may be branched or direct through-holes. The pores may be permeable to vapor but impermeable to liquid.

The membrane for membrane distillation used in the present invention has a water contact angle on the surface of at least one side of 90° or greater, preferably greater than 90°, more preferably 110° or greater, and even more preferably 120° or greater, from the viewpoint of avoiding wetting of the membrane. There is no upper limit to the water contact angle of the membrane in relation to the effect of the present invention, but realistically the upper limit is 1500 or less.

The water contact angle herein is a value measured by the sessile drop method in accordance with JIS R 3257. Specifically, 2 μL of pure water is dropped onto a surface of the measurement target, and the angle formed between the measurement target and the sessile droplet is quantified by analyzing projection images.

It is preferable that the water contact angle in the above ranges be exhibited in substantially all regions of the surface of one side of the membrane for membrane distillation used in the present invention.

Although the shape of the membrane for membrane distillation used in the present invention will be described later, in the case of a hollow-fiber shape, it is preferable that the outer surface of the hollow fiber exhibit the water contact angle in the above ranges.

The average pore size of the membrane for membrane distillation is within the range of 0.02 μm or greater and 0.5 μm or less, preferably within the range of 0.03 μm or greater and 0.3 μm or less. When the average pore size is 0.02 μm or greater, the vapor permeation resistance does not become excessively high, and the concentration rate of the feed solution a can be fast. When the average pore size is 0.5 μm or less, the effect of suppressing wetting of the membrane is satisfactory. The average pore size is a value measured by the half-dry method in accordance with ASTM: F316-86.

From the viewpoint of achieving both vapor permeability and wetting suppression, it is preferable that the pore size distribution of the membrane be narrow. Specifically, the pore size distribution, which is the ratio of the maximum pore size to the average pore size, is preferably within the range of 1.2 to 2.5, more preferably within the range of 1.2 to 2.0. The maximum pore size described above is a value measured by the bubble point method.

From the viewpoint of achieving both high vapor permeability and long-term durability, the porosity of the membrane for membrane distillation is in the range of 60% or greater and 90% or less. In order to obtain high vapor permeability, the porosity of the membrane for membrane distillation is 60% or greater, preferably 70% or greater. From the viewpoint of satisfactorily maintaining the strength of the membrane itself and making issues such as rupture less likely to occur in long-term use, the porosity of the membrane for membrane distillation is 90% or less, preferably 85% or less.

Each surface of the membrane for membrane distillation has a surface opening ratio of preferably 15% or greater, more preferably 18% or greater, and even more preferably 20% or greater, from the viewpoint of obtaining an effective concentration rate. From the viewpoint of satisfactorily maintaining the strength of the membrane itself and making issues such as rupture less likely to occur in long-term use, the surface opening ratio is preferably 60% or less, more preferably 55% or less, and even more preferably 50% or less. The surface opening ratio described above is a value determined by detecting pores with image analysis software in an observation image of a membrane surface by a scanning electron microscope (SEM).

Examples of the material constituting the membrane for membrane distillation include materials containing at least one resin selected from the group consisting of polysulfone, polyethersulfone, polyethylene, polypropylene, polyvinylidene fluoride, polytetrafluoroethylene, an ethylene/tetrafluoroethylene copolymer, and polychlorotrifluoroethylene. From the viewpoint of being able to manufacture a membrane having excellent hydrophobicity, mechanical durability, and thermal durability at high membrane formability, it is preferable to select and use polyvinylidene fluoride, an ethylene/tetrafluoroethylene copolymer, and polychlorotrifluoroethylene.

As one embodiment of the present invention, in order to improve hydrophobicity, a hydrophobic polymer may be attached to at least a portion of the membrane for membrane distillation. The hydrophobic polymer may form a hydrophobic film on a surface of at least one side of the membrane for membrane distillation or inside the membrane to impart the membrane with water repellency or improve the water repellency of the membrane.

After the hydrophobic polymer is dissolved in a suitable solvent such as water or a fluorine-based solvent and the solution is then applied on the membrane for membrane distillation, the hydrophobic polymer can be attached to the surface or the inside of the membrane or both thereof by evaporating the solvent. The hydrophobic polymer solution may be applied by an appropriate method such as spraying or immersion.

Herein, "hydrophobic polymer" means a polymer having low affinity with water, and may be, for example, a polymer having a hydrophobic structure. Examples of the hydrophobic structure include a non-polar group or a weakly polar group, and a non-polar skeleton or a weakly polar skeleton. Examples of the non-polar group or the weakly polar group include a hydrocarbon group and a fluorine-containing group. Examples of the non-polar skeleton or the weakly polar skeleton include a hydrocarbon backbone and a siloxane backbone.

Examples of the hydrophobic polymer include a polymer having a siloxane bond and a fluorine atom-containing polymer, and more specifically include the following:

(A) the polymer having a siloxane bond may be, for example, a dimethyl silicone gel, a methylphenyl silicone gel, a reactive modified silicone gel having an organic functional group (such as an amino group or a fluoroalkyl group), a silicone-based polymer which reacts with a silane coupling agent to form a cross-linked structure, and polymer gels which are cross-linked products thereof; and (B) the fluorine atom-containing polymer may be a polymer having a fluorine atom-containing group in a side chain, wherein the fluorine-atom containing group is, for example, a (per)fluoroalkyl group, a (per)fluoropolyether group, an alkylsilyl group, or a fluorosilyl group.

Particularly, the hydrophobic polymer is preferably a polymer of a (meth)acrylate-based monomer and/or a vinyl-based monomer, having a (per)fluoroalkyl group and/or a (per)fluoropolyether group having 1 to 12 carbon atoms.

The hydrophobic polymer may be attached to the entirety of the pores of the membrane for membrane distillation. However, from the viewpoint of preventing the ingress of liquid into the pores and ensuring vapor permeability, it is preferable that the adhesion amount of hydrophobic polymer be distributed in the thickness direction of the membrane for membrane distillation, the adhesion amount of polymer be large on the surface layer of the membrane where a liquid makes contact therewith, and the adhesion amount be small and the pore structure be maintained inside the membrane in the thickness direction.

From this viewpoint, regarding the adhesion amount of the hydrophobic polymer, it is preferable that the adhesion amount on the surface layer of at least one side of the membrane for membrane distillation be larger than the adhesion amount of the inner portion. It is more preferable that the adhesion amount decrease from the surface layer of one side of the membrane for membrane distillation toward the surface layer of the opposite side.

Herein, "surface layer of the membrane" means a portion of the membrane in contact with a liquid and the vicinity thereof. Quantitatively, the term refers to a range of about 10 μm from the outermost layer portion of the membrane toward the inner portion in the thickness direction. The "inner portion of the membrane" means a portion of the membrane that is not brought into contact with a liquid and allows only vapor to pass therethrough. The term refers to a portion other than a surface layer of the membrane.

In the present invention, the ratio of the adhesion amount of the hydrophobic polymer on the surface layer (inner surface and/or outer surface) of the membrane for membrane distillation to the adhesion amount of the hydrophobic polymer in the inner portion (center portion) thereof is preferably 1.2 or greater, more preferably 2.0 or greater, and particularly preferably 3.0 or greater.

When the adhesion amounts of the hydrophobic polymer on the surface layer and the inner portion of the membrane for membrane distillation are compared by analysis with an appropriate surface analyzer, as described later, the respective measurement values in the following regions of the membrane for distillation are used for the comparison.

Figure 3:
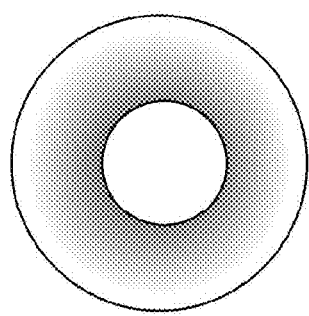
FIG. 3 is a schematic diagram for describing one example of an embodiment relating to the adhesion of a hydrophobic polymer to a membrane applicable to the feed solution concentration system of the present invention.
Figure 3:
Figure 3:

Surface layer of the membrane for membrane distillation: a region from the surface of a membrane for membrane distillation to a depth of 10 μm Inner portion of the membrane for membrane distillation: a region of ±5% of the membrane thickness centered on a depth of ½ of the membrane thickness from the surface of a membrane for membrane distillation FIG. 3 illustrates one example of the distribution of the hydrophobic polymer when the membrane for membrane distillation has a hollow-fiber shape. FIG. 3(*a*) illustrates the distribution of the hydrophobic polymer in the cross-section perpendicular to the longitudinal direction of the hollow fiber, and FIG. 3(*b*) illustrates the distribution of the hydrophobic polymer in the cross-section in longitudinal direction of the hollow fiber. In FIGS. 3(*a*) and (*b*), the darker the gray, the higher the concentration of the hydrophobic polymer is shown.

With reference to FIGS. 3(*a*) and (*b*), in the case of this hollow-fiber membrane for membrane distillation, the adhesion amount of the hydrophobic polymer near the inner surface of the hollow-fiber membrane is large, whereas the amount of the hydrophobic polymer near the outer surface is small. Thus, it is preferable that a feed solution (a) be passed through the hollow portion in contact with the inner surface having a larger adhesion amount of the hydrophobic polymer, from the viewpoint of preventing wetting of the membrane.

The distribution of the hydrophobic polymer may also be large near the outer surface of the hollow fiber and small near the inner surface. In this case, it is preferable that the feed solution (a) be passed through the outside space side of the hollow fiber in contact with the outer surface having a larger adhesion amount of the hydrophobic polymer.

The adhesion amount of the hydrophobic polymer in the membrane for membrane distillation can be determined as a direct mass by extracting the membrane for membrane distillation, to which the hydrophobic polymer is attached, with a satisfactory solvent of the hydrophobic polymer and then removing the solvent from the extract.

In addition, the membrane for membrane distillation, to which the hydrophobic polymer is attached, can be analyzed using an appropriate surface analyzer, and the adhesion amount of the hydrophobic polymer can be determined from the signal intensity ratio between the constituent material of the membrane for membrane distillation and the hydrophobic polymer. Since the surface analyzer can analyze any portion of the membrane for membrane distillation, the attachment distribution of the hydrophobic polymer can be found by comparing the signal intensity ratio of each portion of the membrane. Examples of the surface analyzer in this case include an IR (infrared spectrum absorption) device, an XPS (X-ray photoelectron spectroscopy) device, and a TOF-SIMS (time-of-flight secondary ion analysis) device.

In order to attach a hydrophobic polymer to the membrane for membrane distillation, a method wherein a coating liquid in which the hydrophobic polymer is dissolved in an appropriate solvent is applied to the membrane and dried can be carried out. In order to obtain the desired hydrophobic polymer distribution, methods such as appropriately adjusting the application site, the volatility (boiling point) of the solvent in the coating liquid, the concentration of the hydrophobic polymer in the coating liquid, and the drying conditions after coating can be carried out. For example, when a coating is applied by an immersion method, the lower the volatility of the solvent in the coating liquid (higher boiling point) and the milder the drying conditions after coating, the more the coating liquid containing the hydrophobic polymer can move toward the membrane surface during the drying step. Thus, a distribution in the membrane thickness direction can be generated.

When the hydrophobic polymer is attached in a distribution which decreases from the surface layer on one side of the membrane for membrane distillation toward the surface layer on the opposite side, the surface on the side having a smaller adhesion amount of the hydrophobic polymer may be subjected to a hydrophilization treatment.

The surface on the side having a smaller adhesion amount of the hydrophobic polymer has low hydrophobicity and high affinity with a highly hydrophilic solvent, whereas the surface on the side having a larger adhesion amount of the hydrophobic polymer has high hydrophobicity and low affinity with a highly hydrophilic solvent. According to this, only the surface on the side having a smaller adhesion amount of hydrophobic polymer can be hydrophilized by wetting with a highly hydrophilic solvent.

Figure 4:
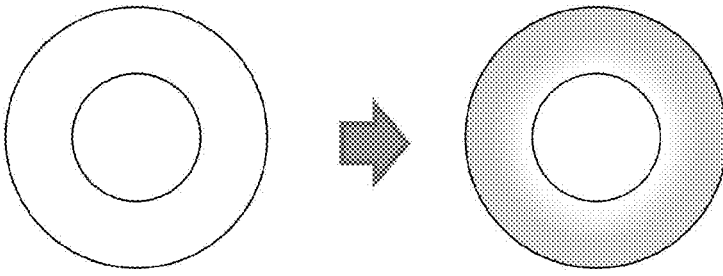
FIG. 4 is a schematic diagram for describing one example of an embodiment relating to hydrophilization of a membrane applicable to the feed solution concentration system of the present invention.

For example, when a membrane having a distribution in which the adhesion amount of the hydrophobic polymer decreases from the surface layer of one side of the membrane for membrane distillation toward the surface layer on the opposite side is immersed in, for example, ethanol, only the portion having a smaller adhesion amount of the hydrophobic polymer becomes wet with ethanol (21), as shown in FIG. 4. When concentration is carried out by a membrane distillation method using a membrane for membrane distillation in this state, the distance in the thickness direction of the membrane through which vapor passes is substantially shortened, and thus the amount of vapor passing through can be increased.

When such a hydrophilized membrane for membrane distillation is used, it is preferable that the surface on the hydrophilized side be brought into contact with the cooling water, and the side on the opposite surface having a larger adhesion amount of the hydrophobic polymer be brought into contact with the feed solution (a).

[Shape and Size of Membrane for Membrane Distillation]

The shape of the membrane for membrane distillation may be any shape, for example, a flat membrane, a hollow-fiber membrane, or a tubular type. When a flat membrane is used, the shape of the membrane module can be selected from, for example, a spiral type, a pleated type, or a laminated type. The membrane may be sealed in a bag or a spacer may be inserted as appropriate so that the feed solution and the cooling liquid do not mix and a flow path is secured.

The thickness of the membrane for membrane distillation of the present invention is preferably 10 μm or greater and 1,000 μm or less, more preferably 20 μm or greater and 500 μm or less, from the viewpoint of achieving both vapor permeability and mechanical strength of the membrane. When the membrane thickness is 1,000 μm or less, high vapor permeability can be obtained. When the membrane thickness is 10 μm or greater, the membrane can be used without deformation.

When the membrane for membrane distillation is a hollow-fiber membrane, the outer diameter is 300 μm or greater and 5,000 μm or less, preferably 350 μm or greater and 4,000 μm or less. The inner diameter of the hollow-fiber membrane is, for example, 200 μm or greater and 4,000 μm or less, preferably 250 μm or greater and 3,000 μm or less.

<Membrane Distillation Module>

In the present invention, when the membrane for membrane distillation has a hollow-fiber shape, a membrane bundle in which a plurality of the hollow-fiber membranes are bundled together may be used as a membrane module for membrane distillation packed in a suitable module.

The module may be a cylindrical type, a polygonal columnar type, or another polyhedral type, and the shape thereof is not limited.

Preferably, the hollow-fiber membrane bundle is housed in a cylindrical or polygonal columnar housing so that the longitudinal direction of the hollow fiber coincides with the axial direction of the housing, and may have a structure in which both ends of the hollow-fiber bundle are fixed in the housing with a suitable adhesive resin. In this case, it is preferable that the hollow-fiber bundle be fixed with the adhesive resin in a liquid-tight manner so that the inner and outer flow paths of the hollow-fiber membrane are not mixed.

It is desirable that the adhesive resin have high mechanical strength and heat resistance at 100° C. Examples of the adhesive resin includes a thermosetting epoxy resin and a thermosetting urethane resin. From the viewpoint of heat resistance, an epoxy resin is preferable. From the viewpoint of handleability, a urethane resin is preferable.

The adhesive fixation method may be a known bonding method relating to the production of a membrane module for membrane distillation.

The configuration of the housing is selected mainly from the viewpoint of chemical resistance, wherein the solute and the solvent contained in the feed solution (a) and cooling water (CW) do not deteriorate various performances; pressure resistance, heat resistance, impact resistance, and weather resistance. For example, a resin or a metal can be used. From the above viewpoint, it is preferable to select a synthetic resin such as polypropylene, polysulfone, polyethersulfone, polyvinylidene fluoride, ABS resin, fiber-reinforced plastic, or vinyl chloride; or a metal such as stainless steel, brass, or titanium.

<Component Retainability of Feed Solution Concentration System of Present Invention>

According to the feed solution concentration system of the present invention as described above, a concentrate having a high concentration, in which the composition of the solute contained in the feed solution is substantially maintained, can be efficiently obtained.

Therefore, the feed solution concentration system of the present invention is suitable for use in, for example, a drug manufacturing process.

The analysis of the solute in the concentrate thus obtained may be appropriately selected in accordance with the feed solution and the components contained in the concentrate. The solute can be analyzed by well-known analysis methods, for example, ICP-MS (inductively coupled plasma mass spectrometry), nuclear magnetic resonance (NMR) method, gas chromatography-mass spectrometry (GC/MS) method, colorimetry method, fluorescence method, or high-performance liquid chromatography (HPLC).

<Concentration Apparatus of Present Invention>

The concentration apparatus of the present invention comprises the membrane for membrane distillation of the present invention as described above.

The concentration apparatus of the present invention is a concentration apparatus for concentrating a feed solution by a membrane distillation method, comprising a membrane for membrane distillation, where a membrane used as the membrane for membrane distillation has a membrane surface water contact angle of 90° or greater, an average pore size in a range of 0.02 μm or greater and 0.5 μm or less, and a porosity of 60% or greater and 90% or less.

The above membrane for membrane distillation may have a hydrophobic polymer attached to at least a portion thereof. The adhesion amount of hydrophobic polymer is distributed in the thickness direction of the membrane for membrane distillation. The adhesion amount attached to the surface layer of at least one side of the membrane for membrane distillation may be larger than the adhesion amount of the inner portion.

Other embodiments of the concentration apparatus of the present invention may be described with reference to the concentration system of the present invention.

EXAMPLES

Hereinafter, the configuration and effect of the present invention will be further described with reference to specific examples. However, the present invention is not limited to the following Examples.

<<Various Properties of Hollow-Fiber Membrane for Membrane Distillation>>

In the present Examples, various properties of the hollow-fiber membrane for membrane distillation were determined by the measurement methods described below.

[Water Contact Angle of Hollow-Fiber Membrane Outer Surface]

The water contact angle of the hollow-fiber membrane for membrane distillation was measured by the sessile drop method based on JIS R 3257.

The contact angle was calculated by dropping sessile droplets of 2 μL of pure water under the conditions of a temperature of 23° C. and a relative humidity of 50% and analyzing the images of angles formed between the droplets and the outer surface of the hollow-fiber membrane. The measurement was carried out 5 times to calculate a numerical average, which was then adopted as the water contact angle.

[Outer Diameter, Inner Diameter, and Membrane Thickness of Hollow-Fiber Membrane]

The outer diameter and inner diameter of the hollow-fiber membrane for membrane distillation were determined by microscopic observation. Specifically, the hollow-fiber membrane was thinly sliced with a razor in a direction perpendicular to the longitudinal direction to obtain a microscopic image of a cross-section. The cross-section was then measured to obtain the outer diameter and inner diameter. The membrane thickness of the hollow-fiber membrane was calculated by the following mathematical formula (1):

[Math. 1]

$$\text{Membrane thickness [mm]} = \frac{\text{outer diameter [mm]} - \text{inner diameter [mm]}}{2} \quad (1)$$

[Average Pore Size of Hollow-Fiber Membrane]

The average pore size of the hollow-fiber membrane for membrane distillation was measured by a method of measuring average pore size (another name: half-dry method) described in ASTM: F316-86.

Using ethanol as the liquid, a hollow-fiber membrane having a length of about 10 cm was measured under standard measurement conditions of 25° C. and a pressurization rate of 0.01 atm/sec.

The average pore size was determined by the following mathematical formula (2):

$$\text{Average pore size [μm]} = 2{,}860 \times (s \text{ [dyne/cm]})/(p \text{ [Pa]}) \quad (2)$$

wherein s is the surface tension of the liquid used, and p is the half-dry air pressure.

Since the value of the surface tension s of the liquid ethanol used at 25° C. is 21.97 dyne/cm, the mathematical formula (2) is modified to $2{,}860 \times s = 62{,}834$ to obtain the following mathematical formula (3). By substituting the value of the half-dry air pressure p into this mathematical formula (3), the average pore size of the hollow-fiber membrane was determined.

$$\text{Average pore size [μm]} = 62{,}834/(p \text{ [Pa]}) \quad (3)$$

[Maximum Pore Size of Hollow-Fiber Membrane]

The maximum pore size of the hollow-fiber membrane for membrane distillation was measured using the bubble point method with ethanol as the immersion solution.

One end of the hollow-fiber membrane having a length of 8 cm was blocked, and a nitrogen gas supply line was connected to the other end through a pressure gauge. In this state, nitrogen gas was supplied to replace the inside of the line with nitrogen, and then the hollow-fiber membrane was immersed in ethanol. The hollow-fiber membrane was immersed in a state of being slightly pressurized with nitrogen so as to keep the ethanol from flowing back into the line. With the hollow-fiber membrane immersed in ethanol, the pressure of the nitrogen gas was gradually increased, and the pressure P (kg/cm²) at which nitrogen gas bubbles began to stably emerge from the hollow-fiber membrane was recorded. The P was substituted into the following formula (4) to calculate the maximum pore size d of the hollow-fiber membrane:

$$d = C1\gamma/P \quad (4)$$

wherein d is the maximum pore size of a hollow fiber, C1 is a constant, γ is the surface tension of the immersion liquid, and P is the pressure. By setting the value of C1γ when ethanol was used as the immersion liquid to 0.632 (kg/cm), the maximum pore size d (μm) was determined.

[Porosity of Hollow-Fiber Membrane]

The porosity of the hollow-fiber membrane for membrane distillation was calculated from the mass of the hollow-fiber membrane and the density (true density) of the material constituting the hollow-fiber membrane.

The hollow-fiber membrane was cut to a certain length, the mass thereof was measured, and the porosity of the hollow fiber was determined by the following mathematical formula (5):

[Math. 2]

$$\text{Porosity [\%]} = \left\{ 1 - \frac{\text{mass of hollow} - \text{fiber membrane [g]}}{d[g/cm^3] \times \left[ \pi\left(\frac{\text{outer diameter [cm]}}{2}\right)^2 - \pi\left(\frac{\text{inner diameter [cm]}}{2}\right)^2 \right] \times \text{length [cm]}} \right\} \times 100 \quad (5)$$

wherein d is the true density of the starting polymer of the hollow-fiber membrane, and π is pi.

[Adhesion Amount of Hydrophobic Polymer]

(1) IR and ATR Methods

The adhesion amounts of hydrophobic polymer in the hollow-fiber membrane for membrane distillation were compared by IR spectrum analysis and ATR method (total reflection method, internal reflection method) using ZnSe crystals as prisms.

For the measurement device, a Spectrum One manufactured by PerkinElmer Co., Ltd. was used, with the pressure contour value set to about 30 for the pressing pressure of the crystal. The adhesion amount of the hydrophobic polymer on the membrane surface was calculated by determining the ratio of the peak intensity from the hydrophobic polymer and the peak intensity from the constituent material of the hollow-fiber membrane, which were obtained from the IR spectrum.

Hollow-fiber membrane samples were cut from the module. For the samples to analyze the outer surface of the hollow-fiber membrane, samples obtained by cutting the hollow-fiber membrane at 1 cm intervals in a cross-section perpendicular to the longitudinal direction were used. For the samples to analyze the inner surface, samples obtained by cutting the hollow-fiber member in the longitudinal direction were used.

In the Examples, the constituent material of the hollow-fiber membrane was polyvinylidene fluoride (PVDF), and an acrylate polymer having a perfluoroalkyl group in a side chain was used as the hydrophobic polymer. The value of $v(C{=}O)/(v(C{-}F)+v(C{=}O))$, the peak intensity ratio of $v(C{=}O)$ of 1,734 cm$^{-1}$ and $(v(C{-}F)+v(C{=}O))$ near 1,180 cm$^{-1}$, was calculated and used as an index of the adhesion amount of hydrophobic polymer.

The peak intensity ratio was measured for each portion of the hollow-fiber membrane. When the minimum value was set to 1.0, it is deemed that a portion indicating a value of 1.2 or greater had a large adhesion amount of hydrophobic polymer.

(2) TOF-SIMS Analysis

In addition to the IR and ATR methods described above, the adhesion amounts of hydrophobic polymer in the hollow-fiber membrane for membrane distillation were compared by observation of the cross-section of the hollow-fiber membrane by TOF-SIMS.

Samples obtained by slicing a hollow-fiber membrane into flakes were used as the observation samples.

The instrument used was a nano-TOF manufactured by ULVAC-PHI, Inc., and with the primary ion set to $Bi_3^{++}$, the acceleration voltage to 30 kV, the current to 0.1 nA (as DC), the analysis area to 350 μm×350 μm, the integration time to 120 min, and the detected ion to negative ion, neutralization was carried out with an electron gun. For each material of the hollow-fiber membrane constituent material and the hydrophobic polymer, mapping with m/z, which has a characteristically strong intensity, was carried out, and the intensity ratios thus obtained were compared to determine the presence ratio of the hydrophobic polymer in each portion.

In TOF-SIMS under the above conditions, an integration time of 30 min is sufficient. However, the integration time was set to 120 min for the analysis in the Examples.

In the Examples, the constituent material of the hollow-fiber membrane was polyvinylidene fluoride (PVDF), and an acrylate polymer having a perfluoroalkyl group in a side chain was used as the hydrophobic polymer. Therefore, m/z=67, which is a particularly strong intensity for PVDF, and m/z=293, which is a particularly strong intensity for a perfluoroacrylate polymer, were adopted, and a ratio thereof was determined.

It can be determined that there is a significant difference in the presence ratio of the hydrophobic polymer when the intensity ratio is 2.0 or greater.

Example 1

(1) Production of Membrane Module for Membrane Distillation and Measurement of Properties of Membrane for Membrane Distillation In Example 1, a hollow-fiber membrane was used as the membrane for membrane distillation (20) without attaching a hydrophobic polymer thereto, and a feed solution (a) was concentrated by membrane distillation. This membrane for membrane distillation (20) was packed into a membrane module for membrane distillation (100) having the configuration illustrated in FIG. 1 and used.

As the membrane for membrane distillation (20), a porous hollow-fiber membrane made of PVDF having an inner diameter of 0.7 mm, an outer diameter of 1.3 mm, and an average pore size of 0.21 μm, a maximum pore size of 0.29 μm, and a porosity of 72% as determined in accordance with ASTM-F316-86 was cut to a length of 15 cm to be used.

The water contact angle of this porous hollow-fiber membrane, measured by the method described above, was 92°.

A plurality of the above membranes for membrane distillation (20) were bundled to form a membrane bundle and housed in a housing (10). A thermosetting epoxy resin was used as the adhesive resin (30), and the membrane bundle of the membranes for membrane distillation (20) was adhesively fixed in the housing (10) by centrifugal adhesion.

Two membrane modules for membrane distillation (100) in which hollow-fiber membranes for membrane distillation were bundled, having an effective length (the length of the portion not embedded in the adhesive resin (30)) of 10 cm and a total membrane area of the inner surface of the membrane for membrane distillation (20) of 200 cm², were produced according to the above operations.

One of the membrane modules for membrane distillation thus obtained was disassembled and subjected to the measurement of the properties of the hollow-fiber membrane.

The measurement results are shown in Table 1.

The remaining membrane module for membrane distillation was used for concentrating a feed solution (a).

(2) Implementation of Membrane Distillation

Using the membrane module for membrane distillation (100) produced above, a membrane distillation apparatus having the configuration illustrated in FIG. 2 was produced, and membrane distillation was carried out.

A solution having the following composition was used as a model solution for a feed solution (a) containing a pharmaceutical substance.

Solvent (b): a mixed solvent in which water and acetonitrile were mixed

The mixing ratio of water and acetonitrile varied, and a concentration operation was carried out at each ratio.

Solute: dipeptide at 1,000 ppm and NaCl at 1,000 ppm

Solution volume: 0.5 L

NaCl was added to the feed solution a as a means to confirm when the membrane for membrane distillation was wetted.

The above feed solution a was filled in the feed solution storage tank (200).

The feed solution a was circulated using a pump at a flow rate of 600 ml/min so as to pass through the inside of the hollow-fiber membrane of the membrane module for membrane distillation (100). At this time, a temperature controller (TC) was used to regulate the temperature of the feed solution a was regulated so as to be maintained at 30° C. on the inlet side of the membrane module for membrane distillation (100).

A cooling water storage tank (300) holding about 2 L of cooling water (CW) was provided, and a pump was used to flow the water at a flow rate of 600 ml/min to the outside of the hollow-fiber membrane of the membrane module for membrane distillation (100). At this time, a temperature controller (TC) was used to regulate the temperature of the cooling water (CW) so as to be maintained at 10° C. In addition, the conductivity of the cooling water (CW) discharged from the membrane module for membrane distillation (100) was measured at all times. When the conductivity of the cooling water (CW) increased to 500 μS/cm or greater, it is considered that the NaCl added to the feed solution (a) became mixed in the cooling water (CW). Therefore, it was determined in this case that the membrane for membrane distillation was wetted.

When the volume of the feed solution (a) determined from the level gauge (LG) mounted to the feed solution storage tank (200) reached 100 ml, the concentration rate was determined to have reached 5-fold, and the concentration was terminated.

In Example 1, the feed solution (a) having a mixing ratio of water and acetonitrile at 95:5 (volume ratio) can be concentrated 5-fold in 39 h. The conductivity of the cooling water (CW) was 5 μS/cm or less at all times, and wetting of the membrane for membrane distillation did not occur.

However, when the mixing ratio of water and acetonitrile was 90:10 (volume ratio), the conductivity of the cooling water (CW) exceeded 500 μS/cm in 8 h from the start of operation. The membrane for membrane distillation became wet, and wetting of the membrane occurred.

Example 2

(1) Production of Membrane Module for Membrane Distillation and Measurement of Properties of Membrane for Membrane Distillation In Example 2, a hydrophobic polymer was attached to the hollow-fiber porous membrane used in Example 1, and a feed solution (a) was concentrated by membrane distillation. A fluororesin-based water repellent "DP02H" manufactured by AGC Seimi Chemical Co., Ltd. was used as the hydrophobic polymer. The "DP02H" is a solution containing an acrylate polymer having a perfluoroalkyl group in a side chain.

Two membrane modules were produced according to the same production method as in Example 1. These modules were completely immersed once in the "DP02H" manufactured by AGC Seimi Chemical Co., Ltd., pulled out, and then dried by flowing dry air to the inside and outside of the hollow-fiber membranes at a flow rate of 20 L/min to attach the hydrophobic polymer to the hollow-fiber membranes, in order to obtain membrane modules for membrane distillation (100).

One of the two membrane modules for membrane distillation (100) thus obtained was disassembled and subjected to the measurement (IR and ATR methods and TOF-SIMS analysis) of the properties of the hollow-fiber membrane. Each property was measured using the center portion of hollow-fiber membrane in the longitudinal direction.

The water contact angle of this porous hollow-fiber membrane after attaching a hydrophobic polymer thereto, measured by the method described above, was 120°.

The measurement results are shown in Table 1.

The remaining membrane module for membrane distillation was used for concentrating a feed solution (a).

(2) Implementation of Membrane Distillation

Except that the membrane module for membrane distillation (100) produced above was used, the membrane distillation apparatus having the configuration illustrated in FIG. 2 was produced in the same manner as in Example 1, and membrane distillation was carried out.

When the membrane module of Example 2 was used, a feed solution (a) having a mixing ratio of water and acetonitrile at 95:5 (volume ratio) could be concentrated 5-fold in 39 h. The conductivity of the cooling water (CW) was 5 μS/cm or less at all times, and wetting of the membrane for membrane distillation did not occur. Further, a feed solution (a) having a mixing ratio of water and acetonitrile at 90:10 (volume ratio) could be concentrated 5-fold in 32 h.

However, when the mixing ratio of water and acetonitrile was 50:50 (volume ratio), the conductivity of the cooling water (CW) exceeded 500 μS/cm in 3 h from the start of operation. The membrane for membrane distillation became wet, and wetting of the membrane occurred.

Example 3

(1) Production of Membrane Module for Membrane Distillation and Measurement of Properties of Membrane for Membrane Distillation In Example 3, a hollow-fiber porous membrane having a hydrophobic polymer attached thereto was used as the membrane for membrane distillation (20).

As the membrane for membrane distillation, a porous hollow-fiber membrane made of PVDF having an inner diameter of 0.7 mm, an outer diameter of 1.3 mm, and an average pore size of 0.05 μm, a maximum pore size of 0.12

μm, and a porosity of 70% as determined in accordance with ASTM-F316-86 was cut to a length of 15 cm to be used.

A fluororesin-based water repellent "DP02H" manufactured by AGC Seimi Chemical Co., Ltd. was used as the hydrophobic polymer.

Using the above hollow-fiber porous membrane, two membrane modules were produced according to the same production method as in Example 1. These modules were immersed in the "DP02H" manufactured by AGC Seimi Chemical Co., Ltd., pulled out, and dried to attach the hydrophobic polymer to hollow-fiber membranes by the same method as in Example 2, in order to obtain membrane modules for membrane distillation (100).

One of the two membrane modules for membrane distillation (100) thus obtained was disassembled and subjected to the measurement (IR and ATR methods and TOF-SIMS analysis) of the properties of the hollow-fiber membrane. Each property was measured using the center portion of the hollow-fiber membrane in the longitudinal direction.

The water contact angle of this porous hollow-fiber membrane after attaching a hydrophobic polymer thereto, measured by the method described above, was 120°.

The measurement results are shown in Table 1.

The remaining membrane module for membrane distillation was used for concentrating a feed solution (a).

(2) Implementation of Membrane Distillation

Except that the membrane module for membrane distillation (100) produced above was used, the membrane distillation apparatus having the configuration illustrated in FIG. 2 was produced in the same manner as in Example 1, and membrane distillation was carried out.

When the membrane module of Example 3 was used, a feed solution (a) having a mixing ratio of water and acetonitrile at 95:5 (volume ratio) could be concentrated 5-fold in 48 h. A feed solution (a) having a mixing ratio of water and acetonitrile at 90:10 (volume ratio) could be concentrated 5-fold in 41 h. Further, when the mixing ratio of water and acetonitrile was 50:50 (volume ratio), 5-fold concentration could be carried out in 36 h. The conductivity of the cooling water (CW) at any concentration was 5 μS/cm or less at all times, and wetting of the membrane for membrane distillation did not occur.

Example 4

(1) Production of Membrane Module for Membrane Distillation and Measurement of Properties of Membrane for Membrane Distillation In Example 4, a hollow-fiber porous membrane having a hydrophobic polymer attached thereto was used as the membrane for membrane distillation (20).

As the membrane for membrane distillation, a porous hollow-fiber membrane made of PVDF having an inner diameter of 0.7 mm, an outer diameter of 1.3 mm, and an average pore size of 0.45 μm, a maximum pore size of 0.80 μm, and a porosity of 71% as determined in accordance with ASTM-F316-86 was cut to a length of 15 cm to be used.

A fluororesin-based water repellent "DP02H" manufactured by AGC Seimi Chemical Co., Ltd. was used as the hydrophobic polymer.

Using the above hollow-fiber porous membrane, two membrane modules were produced according to the same production method as in Example 1. These modules were immersed in the "DP02H" manufactured by AGC Seimi Chemical Co., Ltd., pulled out, and dried to attach the hydrophobic polymer to hollow-fiber membranes by the same method as in Example 2, in order to obtain membrane modules for membrane distillation (100).

One of the two membrane modules for membrane distillation (100) thus obtained was disassembled and subjected to the measurement (IR and ATR methods and TOF-SIMS analysis) of the properties of the hollow-fiber membrane. Each property was measured using the center portion of the hollow-fiber membrane in the longitudinal direction.

The water contact angle of this porous hollow-fiber membrane after attaching a hydrophobic polymer thereto, measured by the method described above, was 120°.

The measurement results are shown in Table 1.

The remaining membrane module for membrane distillation was used for concentrating a feed solution (a).

(2) Implementation of Membrane Distillation

Except that the membrane module for membrane distillation (100) produced above was used, the membrane distillation apparatus having the configuration illustrated in FIG. 2 was produced in the same manner as in Example 1, and membrane distillation was carried out.

When the membrane module of Example 2 was used, a feed solution (a) having a mixing ratio of water and acetonitrile at 95:5 (volume ratio) could be concentrated 5-fold in 24 h. A feed solution (a) having a mixing ratio of water and acetonitrile at 90:10 (volume ratio) could be concentrated 5-fold in 18 h. In these cases, the conductivity of the cooling water (CW) was 5 µS/cm or less at all times, and wetting of the membrane for membrane distillation did not occur.

However, when the mixing ratio of water and acetonitrile was 50:50 (volume ratio), the conductivity of the cooling water (CW) exceeded 500 µS/cm in 2 h from the start of operation. The membrane for membrane distillation became wet, and wetting of the membrane occurred.

Example 5

(1) Production of Membrane Module for Membrane Distillation and Measurement of Properties of Membrane for Membrane Distillation In Example 3, a hydrophobic polymer was attached to the hollow-fiber porous membrane used in Example 1 by a method different from Example 2, and a feed solution (a) was concentrated by membrane distillation thereby. As the hydrophobic polymer, a fluororesin-based water repellent "FS-392B" (polymer concentration of 0.15% by mass) manufactured by Fluoro Technology was used, and the low boiling point solvent was removed to increase the polymer concentration to 0.5% by mass to obtain a concentrated concentrate, which was then subjected to an attachment operation of the hydrophobic polymer.

Two membrane modules were produced according to the same production method as in Example 1. These modules were immersed in the "FS-392B" concentrate manufactured by Fluoro Technology, pulled out, and then dried by flowing dry air to only the inside of the hollow-fiber membranes at a flow rate of 200 ml/min. The immersion and finishing operations were repeated for a total of two runs to attach the hydrophobic polymer to the hollow-fiber membranes, in order to obtain membrane modules for membrane distillation (100).

One of the two membrane modules for membrane distillation thus obtained was disassembled and subjected to the measurement of the properties of the hollow-fiber membrane.

The water contact angle of this porous hollow-fiber membrane after attaching a hydrophobic polymer thereto, measured by the method described above, was 130°.

The measurement results are shown in Table 1.

The remaining membrane module for membrane distillation was used for concentrating a feed solution (a).

(2) Implementation of Membrane Distillation

Except that membrane module for membrane distillation (100) produced above was used, the membrane distillation apparatus having the configuration illustrated in FIG. 2 was produced in the same manner as in Example 1, and membrane distillation was carried out.

When the membrane module of Example 3 was used, a feed solution (a) having a mixing ratio of water and acetonitrile at 95:5 (volume ratio) could be concentrated 5-fold in 41 h. The conductivity of the cooling water (CW) was 5 µS/cm or less at all times, and wetting of the membrane for membrane distillation did not occur.

A feed solution (a) have a mixing ratio of water and acetonitrile at 90:10 (volume ratio) could be concentrated 5-fold in 33 h. When the mixing ratio of water and acetonitrile was 50:50 (volume ratio), 5-fold concentration could be carried out in 24 h, and the conductivity of the generated water was 5 µS/cm or less at all times.

Further, when a feed solution (a) using a mixed solvent containing water and isopropanol as the solvent (b) at a volume ratio of 50:50 was concentrated, 5-fold concentration could be carried out in 20 h, the conductivity of the cooling water (CW) was 5 µS/cm or less at all times.

Example 6

A membrane module produced in the same manner as in Example 5 was immersed in ethanol for 5 min. Thereafter, the outside of the hollow-fiber membrane in the membrane module was washed with running water for 10 min. By this operation, the inside of the hollow-fiber membrane was not wetted with ethanol, and only the outside was wetted and became hydrophilic.

Except that a membrane module in this state was used, the membrane distillation apparatus having the configuration illustrated in FIG. 2 was produced in the same manner as in Example 1. A feed solution (a) using a mixed solvent containing water and isopropanol at a volume ratio of 50:50 was concentrated.

As a result, the time to concentrate a feed solution (a) 5-fold was shortened to 14 h. The conductivity of the cooling water (CW) was 5 µS/cm or less at all times.

By hydrophilizing a portion of the hollow-fiber membrane, it is considered that the effective thickness of the membrane for membrane distillation in which a portion of the membrane contained water could be reduced, and the distance through which the solvent (b), which became vapor during membrane distillation, passed in the thickness direction of the membrane became shorter.

Comparative Example 1

In Comparative Example 1, a hollow-fiber membrane made of polyacrylonitrile having an inner diameter of 0.7 mm, an outer diameter of 1.2 mm, an average pore size of 0.01 am, a maximum pore size of 0.03 µm, and a porosity of 68% was cut to a length of 15 cm to be used as a membrane for membrane distillation (20). The water contact angle of this porous hollow-fiber membrane, measured by the method described above, was 84°.

Except that the above porous hollow-fiber membrane was used, two membrane module for membrane distillation (100) were produced in the same manner as in Example 1.

One of the membrane modules for membrane distillation thus obtained was disassembled and subjected to the measurement of the properties of the hollow-fiber membrane. The measurement results are shown in Table 1.

The remaining membrane module for membrane distillation was used for concentrating a feed solution (a).

Except that the obtained membrane module for membrane distillation (100) was used, a membrane distillation apparatus having the configuration illustrated in FIG. 2 was produced in the same manner as in Example 1. Membrane distillation of a feed solution (a) in which a mixed solvent containing water and acetonitrile at a volume ratio of 95:5 was used was carried out.

However, even after 50 h of operation, 5-fold concentration was not reached.

Comparative Example 2

A hollow-fiber membrane made of PVDF having an inner diameter of 0.7 mm, an outer diameter of 1.3 mm, an average pore size of 0.12 µm, a maximum pore size of 0.60 µm, and a porosity of 69% was cut to a length of 15 cm to be used as a membrane for membrane distillation (20). The water contact angle of this porous hollow-fiber membrane, measured by the method described above, was 92°.

Except that the above porous hollow-fiber membrane was used, two membrane modules for membrane distillation (100) were produced in the same manner as in Example 1.

One of the membrane modules for membrane distillation thus obtained was disassembled and subjected to the measurement of the properties of the hollow-fiber membrane. The measurement results are shown in Table 1.

The remaining membrane module for membrane distillation was used for concentrating a feed solution (a).

Except that the above membrane module for membrane distillation (100) was used, a membrane distillation apparatus having the configuration illustrated in FIG. 2 was produced in the same manner as in Example 1. Membrane distillation of a feed solution (a) in which a mixed solvent containing water and acetonitrile in a volume ratio of 95:5 was used was carried out.

However, after 13 h of operation, the conductivity of the cooling water (CW) exceeded 500 µS/cm, causing wetting of the membrane. Thus, further concentration could not be carried out.

TABLE 1

| | Hollow-fiber membrane constituent material | Inner diameter (mm) | Outer diameter (mm) | Average pore size (µm) | Maximum pore size (µm) | Porosity (%) | Hydrophobic polymer adhesion Type |
|---|---|---|---|---|---|---|---|
| Example 1 | PVDF | 0.7 | 1.2 | 0.21 | 0.29 | 72 | — |
| Example 2 | PVDF | 0.7 | 1.2 | 0.21 | 0.29 | 72 | DP02H |
| Example 3 | PVDF | 0.7 | 1.2 | 0.05 | 0.12 | 70 | DP02H |
| Example 4 | PVDF | 0.7 | 1.2 | 0.45 | 0.80 | 71 | DP02H |
| Example 5 | PVDF | 0.7 | 1.2 | 0.21 | 0.29 | 72 | FS-392B |
| Example 6 | PVDF | 0.7 | 1.2 | 0.21 | 0.29 | 72 | FS-392B |
| Comparative Example 1 | PAN | 0.7 | 1.2 | 0.01 | 0.03 | 68 | — |
| Comparative Example 2 | PVDF | 0.7 | 1.2 | 0.12 | 0.60 | 69 | — |

| | | | Hydrophilization treatment | | Outer surface |
|---|---|---|---|---|---|
| | | Hydrophobic polymer adhesion Adhesion method | Hydrophilizing agent | Treatment method | water contact angle |
| Example 1 | | — | — | — | 92° |
| Example 2 | | Immersion → drying on both sides (once) | — | — | 120° |
| Example 3 | | Immersion → drying on both sides (once) | — | — | 120° |
| Example 4 | | Immersion → drying on both sides (once) | — | — | 120° |
| Example 5 | | Immersion → inner surface drying (twice) | — | — | 130° |
| Example 6 | | Immersion → inner surface drying (twice) | Ethanol | Immersion → outer surface washing with water | 92° |
| Comparative Example 1 | | — | — | — | 84° |
| Comparative Example 2 | | — | — | — | 92° |

TABLE 1-continued

| | IR and ATR methods Peak intensity ratio | | TOF-SIMS analysis Signal intensity ratio | | |
|---|---|---|---|---|---|
| | Inner surface | Outer surface | Inner surface | Center portion | Outer surface |
| Example 1 | — | — | — | — | — |
| Example 2 | 0.02 | 0.02 | 0.04 | 0.03 | 0.05 |
| Example 3 | 0.02 | 0.02 | 0.05 | 0.03 | 0.05 |
| Example 4 | 0.02 | 0.02 | 0.06 | 0.03 | 0.06 |
| Example 5 | 0.06 | 0.02 | 0.21 | 0.07 | 0.05 |
| Example 6 | — | — | — | — | — |
| Comparative Example 1 | — | — | — | — | — |
| Comparative Example 2 | — | — | — | — | — |

*Hydrophobic polymer analysis* spans the table header above.

| | | Results of concentration by membrane distillation | | |
|---|---|---|---|---|
| | | Composition of solvent (b) (volume ratio) | Time required for 5-fold concentration | Wetting of membrane |
| | Example 1 | Water:AcCN = 95:5 | 39 h | None |
| | | Water:AcCN = 90:10 | — | Wetting in 8 h |
| | Example 2 | Water:AcCN = 95:5 | 39 h | None |
| | | Water:AcCN = 90:10 | 32 h | None |
| | | Water:AcCN = 50:50 | — | Wetting in 3 h |
| | Example 3 | Water:AcCN = 95:5 | 48 h | None |
| | | Water:AcCN = 90:10 | 41 h | None |
| | | Water:AcCN = 50:50 | 36 h | None |
| | Example 4 | Water:AcCN = 95:5 | 24 h | None |
| | | Water:AcCN = 90:10 | 18 h | None |
| | | Water:AcCN = 50:50 | — | Wetting in 2 h |
| | Example 5 | Water:AcCN = 95:5 | 41 h | None |
| | | Water:AcCN = 90:10 | 33 h | None |
| | | Water:AcCN = 50:50 | 24 h | None |
| | | Water:IPA = 50:50 | 20 h | None |
| | Example 6 | Water:IPA = 50:50 | 14 h | None |
| | Comparative Example 1 | Water:AcCN = 95:5 | >50 h (target not reached) | — |
| | Comparative Example 2 | Water:AcCN = 95:5 | — | Wetting in 13 h |

Each of the abbreviations in Table 1 has the following meaning.

<Hollow-Fiber Membrane Constituent Material>
PVDF: polyvinylidene fluoride
PAN: polyacrylonitrile <Hydrophobic Polymer>
DP02H: fluororesin-based water repellent "DP02H", manufactured by AGC Seimi Chemical Co., Ltd.
FS-392B: fluororesin-based water repellent "FS-392B", manufactured by Fluoro Technology <Solvent (b)>
AcCN: acrylonitrile
IPA: isopropanol

REFERENCE SIGNS LIST

10 housing
11 first housing side pipe
12 second housing side pipe
20 membrane for membrane distillation
30 adhesive resin
100 membrane module for membrane distillation
200 feed solution storage tank
300 cooling water storage tank
a feed solution
b solvent
c concentrate
CW cooling water FM flow meter
LG level gauge
P pump
PG pressure gauge
TC temperature controller

The invention claimed is:

1. A feed solution concentration system for a drug manufacturing process, the feed solution concentration system comprising a distillation membrane apparatus in which a feed solution containing a solvent and a solute is brought into contact with cooling water via a membrane in the distillation membrane apparatus and the solvent in the feed solution is passed through the membrane as a vapor and moved to the cooling water side, wherein the membrane is a porous membrane and has a surface water contact angle of 90° or greater, an average pore size in a range of 0.02 μm or greater and 0.5 μm or less, and a porosity of 60% or greater to 90% or less, a hydrophobic polymer is attached to at least a portion of the membrane and is present on both sides of the membrane, and the hydrophobic polymer has an adhesion amount with a distribution in a thickness direction of the membrane, and the adhesion amount on a surface layer of at least one side of the membrane is larger than an adhesion amount of an inner portion.

2. The feed solution concentration system according to claim 1, wherein the adhesion amount of the hydrophobic polymer decreases from the surface layer of one side of the membrane for membrane distillation toward a surface layer on an opposite side.

3. The feed solution concentration system according to claim 2, wherein the opposite side having a smaller adhesion amount of the hydrophobic polymer is hydrophilized, and a surface of the hydrophilized side is brought into contact with cooling water; and the one side having a larger adhesion amount of the hydrophobic polymer is not hydrophilized, and the one side is brought into contact with the feed solution.

4. The feed solution concentration system according to claim 1, wherein the hydrophobic polymer is a polymer having a fluorine atom-containing group in a side chain, and comprises at least one side chain selected from a (per) fluoroalkyl group, a (per) fluoropolyether group, an alkylsilyl group, and a fluorosilyl group.

5. The feed solution concentration system according to claim 1, wherein a material of the membrane for membrane distillation includes at least one resin selected from the group consisting of polysulfone, polyethersulfone, polyethylene, polypropylene, polyvinylidene fluoride, polytetrafluoroethylene, an ethylene/tetrafluoroethylene copolymer, and polychlorotrifluoroethylene.

6. The feed solution concentration system according to claim 1, wherein the solvent includes at least one selected from the group consisting of water, acetonitrile, methanol, ethanol, and isopropanol.

7. The feed solution concentration system according to claim 1, wherein the solute is at least one selected from the group consisting of an amino acid, a peptide, a protein, a saccharide, a vaccine, a nucleic acid, an antibiotic, an antibody-drug conjugate (ADC), and a vitamin.

8. The feed solution concentration system according to claim 1, wherein the solute has a number-average molecular weight of 100 to 50,000.

9. The feed solution concentration system according to claim 1, wherein the feed solution is regulated to a temperature range of 5° C. or higher and 50° C. or lower.

10. The feed solution concentration system according to claim 1, wherein the solute is at least one selected from the group consisting of an amino acid, a peptide, a protein, a saccharide, a vaccine, a nucleic acid, an antibiotic, an antibody-drug conjugate (ADC), and a vitamin.

11. The feed solution concentration system according to claim 1, wherein the solute is at least one selected from the group consisting of an amino acid, a peptide, a protein, a saccharide, a vaccine, a nucleic acid, an antibiotic, an antibody-drug conjugate (ADC), and a vitamin.

12. The feed solution concentration system according to claim 2, wherein the solute is at least one selected from the group consisting of an amino acid, a peptide, a protein, a saccharide, a vaccine, a nucleic acid, an antibiotic, an antibody-drug conjugate (ADC), and a vitamin.

13. The feed solution concentration system according to claim 3, wherein the solute is at least one selected from the group consisting of an amino acid, a peptide, a protein, a saccharide, a vaccine, a nucleic acid, an antibiotic, an antibody-drug conjugate (ADC), and a vitamin.

14. A concentration apparatus for concentrating a feed solution by membrane distillation, the concentration apparatus comprising a membrane for membrane distillation, wherein the membrane has a membrane surface water contact angle of 90° or greater, an average pore size in a range of 0.02 μm or greater and 0.5 μm or less, and a porosity of 60 to 90%, a hydrophobic polymer is attached to at least a portion of the membrane and is present on both sides of the membrane, and an adhesion amount of the hydrophobic polymer has a distribution in a thickness direction of the membrane, and an adhesion amount to a surface layer of at least one side of the membrane is larger than an adhesion amount to an inner portion.

* * * * *